June 21, 1949.   LA VERNE R. PHILPOTT   2,473,542
ELECTRIC TACHOMETER
Filed Feb. 25, 1944
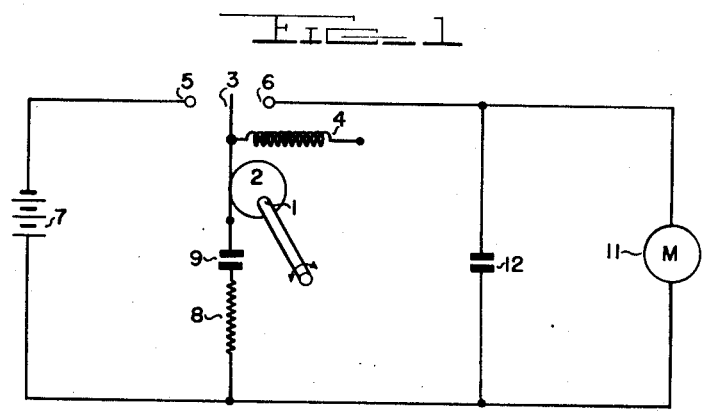
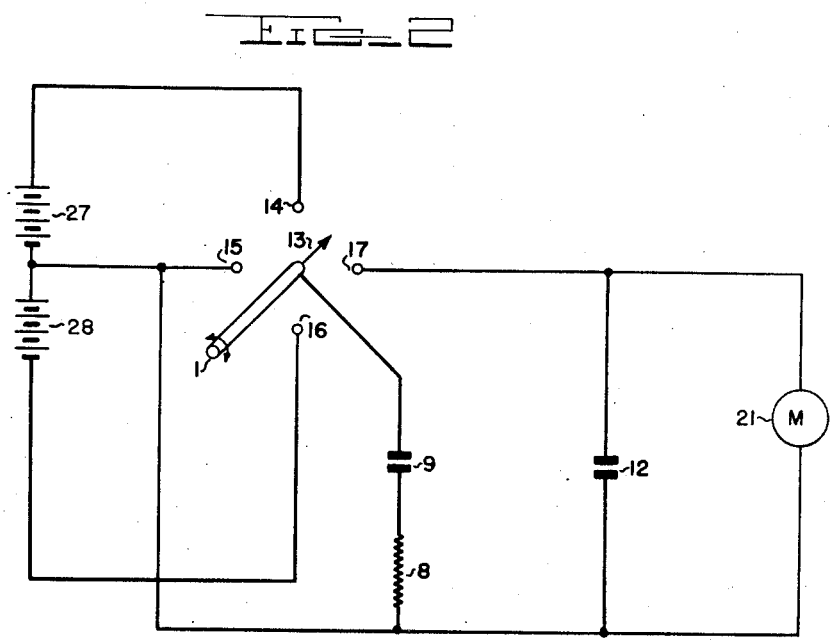
Inventor
LA VERNE R. PHILPOTT
By
Attorney Patented June 21, 1949

2,473,542

UNITED STATES PATENT OFFICE 2,473,542

ELECTRIC TACHOMETER

La Verne R. Philpott, Washington, D. C.

Application February 25, 1944, Serial No. 523,957

1 Claim. (Cl. 175—183)

(Granted under the act of March 3, 1883, as amended April 30, 1928; 370 O. G. 757)

The present invention relates to a system for indicating the speed of a rotating device which is positioned at a point remote from the observer. More particularly the invention relates to an electrically actuated tachometer for indicating the speed of a body at a distance.

It is the object of this invention to provide a tachometer or speedometer arrangement which is novel, simple and practical. This and other objects of the invention will appear hereinafter.

For accomplishing the object of this invention, there is provided a movable contact, adapted to be operated by the motion of the body, the speed of which it is desired to observe, to alternately close contact with one of several stationary contacts. Alternate closures connect an impedance in series with a D. C. source and intermediate closures connect the said impedance to a measuring circuit.

Having thus briefly described my invention, attention is invited to the accompanying drawings in which:

Fig. 1 is a drawing of a circuit adapted to accomplish the objects of this invention; and Fig. 2 is a circuit diagram of a modified form of the invention.

Referring now more particularly to Fig. 1, 1 is a shaft which rotates at a speed which is proportional to the motion of the body the speed of which it is desired to indicate. A cam 2, mounted upon said shaft 1, rotates therewith and is disposed to actuate the movable contact arm 3, which is held against the cam 2 by spring 4, to alternately close contact with contacts 5 and 6.

Closure of contact 5 connects the battery 7 in series with the resistance 8 and condenser 9 and charges the latter. When contact 6 is closed, the condenser 9 and resistance 8 are connected to the metering circuit including the meter 11 and condenser 12 in parallel. The meter 11 will indicate a current which will vary directly with the frequency of the closure of contacts 5 and 6.

Attention is now invited to Fig. 2 which shows a modification of the invention by the means of which the direction of rotation as well as the speed of the motion of a body may be determined. In this modification, shaft 1 may be subject to rotation in either direction as indicated. The contact arm 13 which is connected to rotate with shaft 1 is adapted to contact the contacts 14, 15, 16 or 17 alternatively. The double battery 27—28 has its positive potential terminal connected to contact 14, its mid-potential terminal connected to contact 15 and its negative potential terminal connected to contact 16.

The movable contact 13 is connected in series with condenser 9 and resistance 8 and the latter is connected to the mid-potential terminal of the battery 27—28. The metering circuit is composed of the meter 21 and the large capacity condenser 12 connected in parallel between the contact 17 and the resistor 8.

The meter 21 is a meter similar to 11 shown in Fig. 1, but it is of the center-zero type for a reason which will become apparent hereinafter.

When the shaft 1 is rotating in a clockwise direction and the contact 13 closes contact with 14, the condenser is charged by the portion 27 of the battery 27—28. When 13 closes with contact 17, this charge is applied to the metering circuit. This will cause the meter to be deflected in the direction which is indicative of a positive potential, designating clockwise rotation. When the contact 13 closes with contact 16, the voltage of the portion 28 of the battery 27—28 charges condenser 9, but when contact 13 closes with contact 15, this charge is discharged again through resistor 8. This cycle is repeated and the speed of rotation is indicated by the amount of deflection of meter 21 and the direction of rotation is indicated by the direction of this deflection.

When the rotation of the shaft 1 is in the counter-clockwise direction however, the voltage of the portion 28 of the battery 27—28 is impressed upon the condenser 9 and then upon the metering circuit resulting in a negative indication of meter 21 indicative of rotation in a counter-clockwise direction whereas the voltage that is impressed upon the condenser 9 when contact 14 is closed is discharged when the next contact, contact 15, is closed.

It is to be noted that the capacity of condenser 12 is much greater than that of the condenser 9 and because of this fact, the former will not become fully charged but will tend to smooth the ripple from the voltage supplied to the meter.

Having thus described this invention, it is pointed out that it is not limited to the specific forms shown for the purpose of illustration, but merely by the scope of the invention as indicated by the following claim.

The invention described herein may be manufactured and used by or for the Government of the United States of America for governmental purposes without the payment of any royalties thereon or therefor.

I claim:

Means for indicating the speed and direction of rotation of a body by the use of an electric circuit. which comprises a rotating shaft whose speed of rotation is proportional to the speed of the body whose speed it is desired to indicate, a switch contact arm mounted on said shaft and adapted to rotate therewith, four stationary contact points adapted to be sequentially contacted by said contact arm, a low potential voltage source having positive potential, negative potential, and mid-potential terminals, said positive and negative potential terminals being connected to opposite contact points and said mid-potential being connected to a contact point intermediate said last mentioned contact points, a series connected condenser and resistance connected between said contact arm and said mid-potential contact, and a metering circuit connected between the fourth contact and said mid-potential point, said metering circuit being composed of a center-zero type meter and a high capacity condenser connected in parallel therewith, whereby said meter will give readings which are indicative of the speed and direction of rotation of said body.

LA VERNE R. PHILPOTT.

REFERENCES CITED

The following references are of record in the file of this patent:

UNITED STATES PATENTS

| Number | Name | Date |
|---|---|---|
| 1,571,960 | Needham | Feb. 9, 1926 |
| 1,665,857 | Needham | Apr. 10, 1928 |
| 2,019,769 | Poole | Nov. 5, 1935 |
| 2,091,025 | Breer | Aug. 24, 1937 |
| 2,108,014 | Jones | Feb. 8, 1938 |
| 2,113,011 | White | Apr. 5, 1938 |
| 2,226,185 | Sturm | Dec. 24, 1940 |
| 2,381,250 | Baumann | Aug. 7, 1945 |